United States Patent [19]

Forrester

[11] Patent Number: 4,460,268
[45] Date of Patent: Jul. 17, 1984

[54] AUTOMATIC COMPENSATION FOR CARRIAGE FLYBACK

[75] Inventor: John A. Forrester, Ontario, N.Y.

[73] Assignee: Xerox Corporation, Stamford, Conn.

[21] Appl. No.: 499,048

[22] Filed: May 27, 1983

[51] Int. Cl.³ .............................................. G03G 15/28
[52] U.S. Cl. ........................................ 355/8; 188/280; 355/51
[58] Field of Search .................... 355/8, 60, 51, 11; 188/266, 280

[56] References Cited

U.S. PATENT DOCUMENTS

| | | | |
|---|---|---|---|
| 1,192,353 | 7/1916 | Stevens | 188/280 |
| 3,722,638 | 3/1973 | McClure | 188/280 |
| 3,918,806 | 11/1975 | Cook | 355/8 |
| 4,061,295 | 12/1977 | Somm | 244/104 |
| 4,305,653 | 12/1981 | Evanitsky | 355/8 |
| 4,371,254 | 2/1983 | Beery | 355/8 |
| 4,386,842 | 6/1983 | Beery | 355/8 |

Primary Examiner—J. V. Truhe
Assistant Examiner—David Warren

[57] ABSTRACT

A control to automatically adjust the air bleed screw on a pneumatic dashpot to alter the return speed of a scanning carriage. At the start of the carriage flyback, an end of scan position signal is generated and a second signal is generated when the carriage has reached the home position. These two signals conveyed to control logic determine the time period of the scan flyback. The time period of scan flyback is compared to an acceptable window or range of flyback time periods. If the scan flyback time period is outside the range of acceptable time periods, an adjust drive signal is conveyed to an adjust solenoid. The activation of the solenoid causes the solenoid armature to move a ratchet wheel into engagement with the pneumatic dashpot air bleed screw. Upon the succeeding forward or reverse scan of the carriage, a pawl secured to the carriage drive cable engages the ratchet wheel to turn the ratchet wheel in either a clockwise or counterclockwise direction, in turn rotating the air bleed screw either in the counterclockwise or clockwise direction. This will result in an automatic adjustment, either a greater damping or less damping of the pneumatic dashpot, depending upon whether the flyback time was greater or less than the acceptable range. The process is repeated as necessary until the scan flyback time is adjusted to the acceptable range.

8 Claims, 7 Drawing Figures

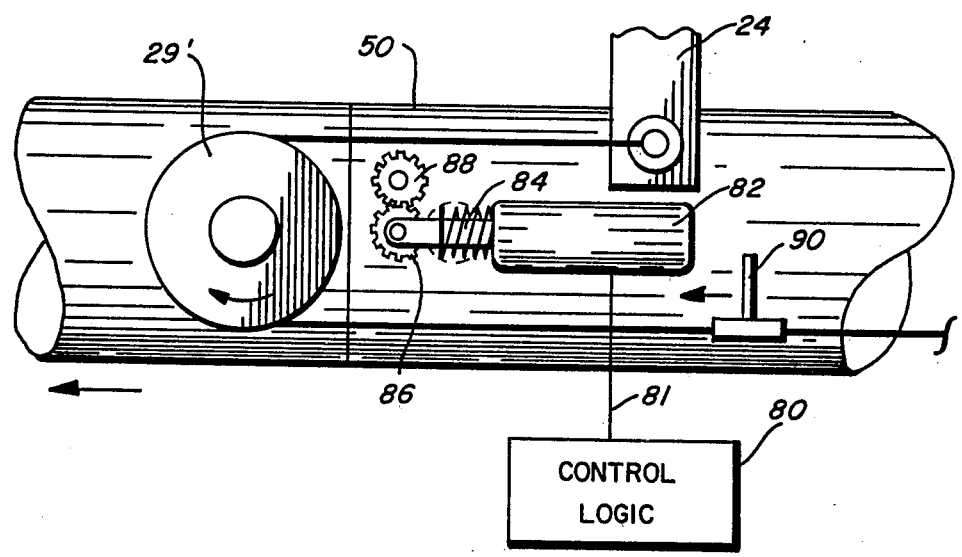

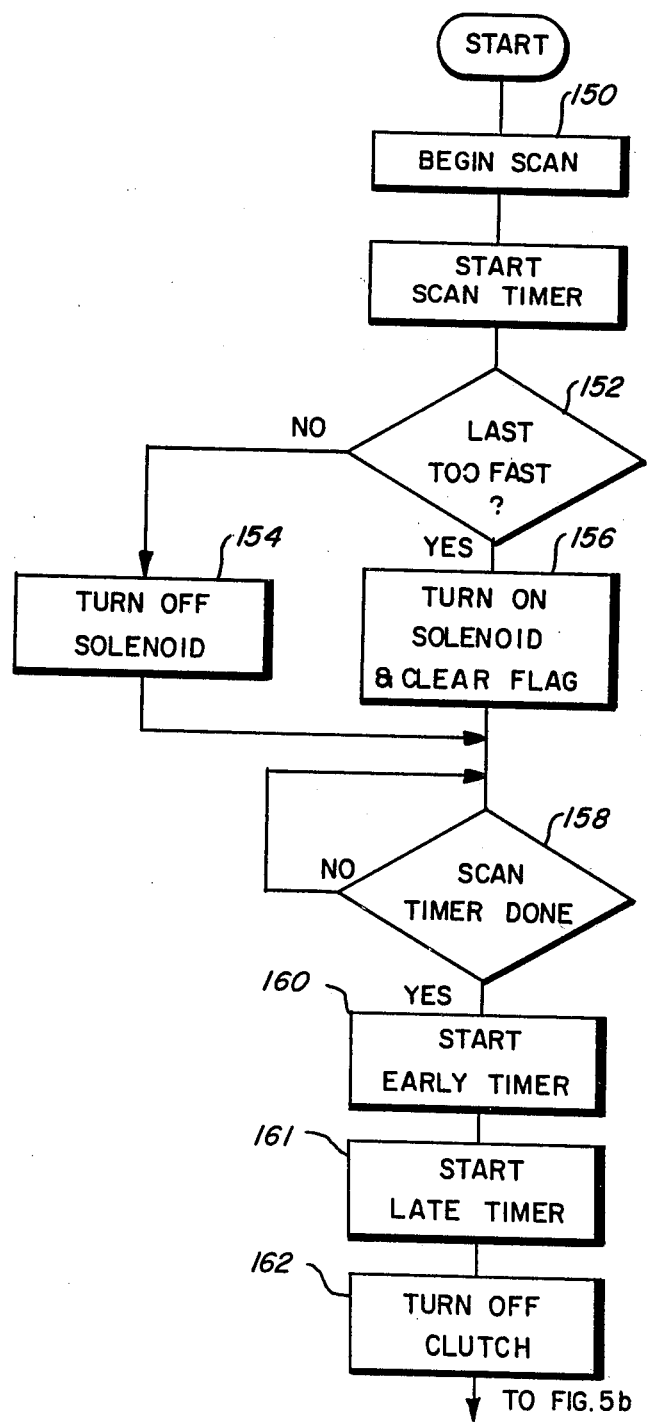

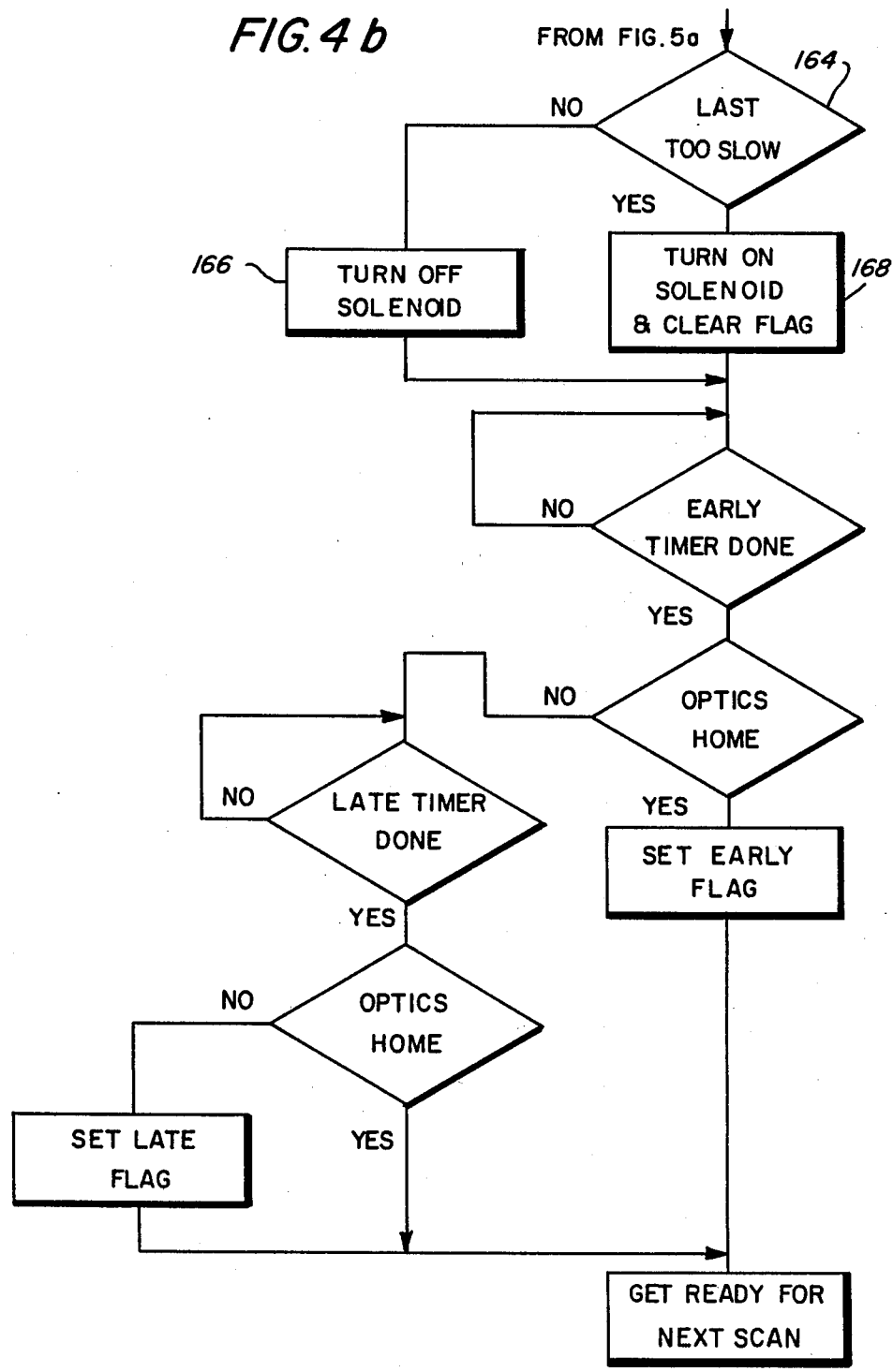

AUTOMATIC COMPENSATION FOR CARRIAGE FLYBACK

This invention relates to a dashpot for use in controlling movement of a carriage, and in particular to a system for automatically compensating for the speed of the return travel of the carriage.

Lamps and scanning mirrors for exposing successive portions of a document to be copied onto a photosensitive surface are often supported on a carriage. Generally, the carriage slowly scans across the document and is then quickly returned to an initial portion after it reaches the end of the document being scanned. The lamps and the scanning mirrors are often sensitive to acceleration and deceleration and cannot be jarred from a precise alignment.

Normally the carriage is driven in one direction by means of a cable connected through a clutch to the main drive of the mahcine and is returned at a much higher speed under the influence of a spring when the clutch is disengaged. At the end of the return stroke, the carriage collides with a buffer. Various means have been used to soften the collison, for example, air vanes driven by the movement of the carriage acting as a governor. Also conventional fixed pneumatic dashpots struck by the carriage at the end of the travel have been provided. Various hydraulic cylinders or dashpots are, of course, in general use and are well known, for example as shown in U.S. Pat. No. 3,722,638. In addition, U.S. Pat. No. 3,918,806 discloses a dual carriage scanning system in which damping of one carriage at one speed also provides damping of a second carriage at a second speed.

The return or flyback velocity of carriage return systems often varies due to changes in friction, spring force, cable tension and dashpot seal effectiveness. This could result in slamming of the carriage in the case of underdamping and failure to return if the system is overdamped. To correct for such conditions, it is often necessary to have a service representative periodically diagnose the operation and adjust the dashpot. U.S. Pat. No. 4,305,653 discloses a system to record the forward scan and flyback scan time periods of a carriage, and the display of suitable time period information relating to the scanning parameters and component variations for use in machine diagnostics. It is also disclosed in U.S. Pat. NO. 1,192,353 to be able to adjust the dashpot effect in response to the sensed speed of the carriage. However, the carriage speed is not related to the changing dashpot parameters. It is also known in U.S. Pat. No. 4,061,295 to be able to automatically change the orifice of a shock absorber after the initial compression of the load. None of the references, however, in the prior art teach a mechanism for automatically adjusting the dashpot air bleed in a carriage return system to adjust the speed of return in response to changes in various system components and parameters.

It would be desirable, therefore, to provide automatic compensation for carriage flyback velocity. Accordingly, it is an object of the present invention to provide a new and improved flyback velocity compensation system. It is another object of the present invention to provide an automatic compensation system for a carriage flyback in a carriage scanning system to compensate for the various parameters of the flyback system such as changes in friction, spring force, cable tension, and dashpot seal effectiveness. Further objects and advantages of the present invention will become apparent as the following description proceeds and the features of novelty characterizing the invention will be pointed out with particularity in the claims annexed to and forming a part of this specification.

Briefly, the present invention is a control to automatically adjust the air bleed screw on a pneumatic dashpot to alter the return speed of a scanning carriage. At the start of the carriage flyback, an end of scan position signal is generated and a second signal is generated when the carriage has reached the home position. These two signals conveyed to control logic determine the time period of the scan flyback. The time period of scan flyback is compared to an acceptable window or range of flyback time periods. If the scan flyback time period is outside the range of acceptable time periods, an adjust drive signal is conveyed to an adjust solenoid. The activation of the solenoid causes the solenoid armature to move a ratchet wheel into engagement with the pneumatic dashpot air bleed screw. Upon the succeeding forward or reverse scan of the carriage, a pawl secured to the carriage drive cable engages the ratchet wheel to turn the ratchet wheel in either a clockwise or counterclockwise direction, in turn rotating the air bleed screw either in the counterclockwise or clockwise direction. This will result in an automatic adjustment either a greater damping or less damping of the pneumatic dashpot, depending upon whether the flyback time was greater or less than the acceptable range. The process is repeated as necessary until the scan flyback time is adjusted to the acceptable range.

For a better understanding of the present invention, reference may be had to the accompanying drawings wherein the same reference numerals have been applied to like parts and wherein:

FIG. 3 illustrates the automatic adjustment of the dashpot according to the present invention;

FIGS. 4a and 4b are flow charts of the control according to the present invention.

Figure 1:
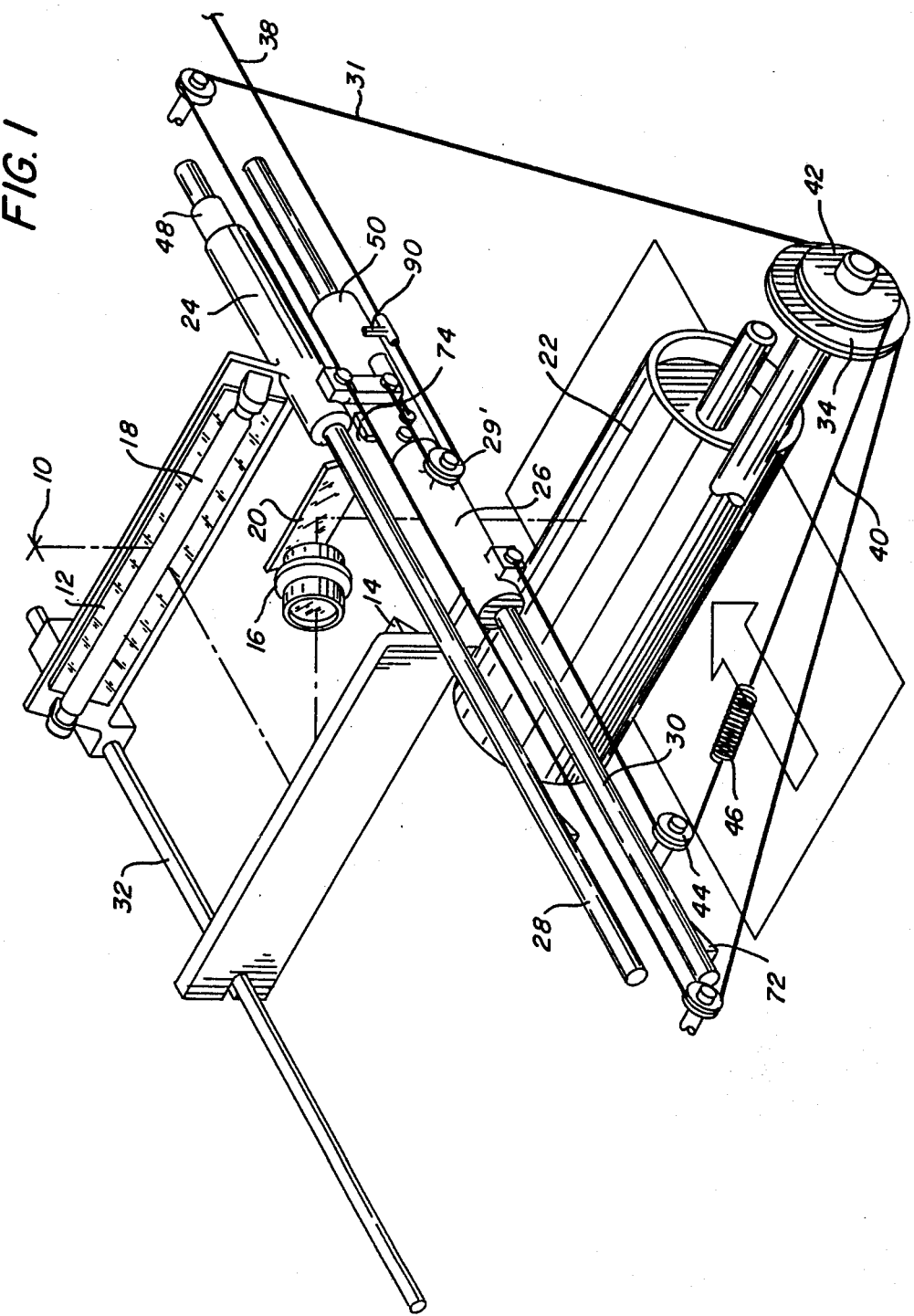
FIG. 1 shows schematically an embodiment of the carriage drive assembly of a document scanning system of a machine in accordance with the present invention.

With reference to FIG. 1, there is illustrated a scanning carriage and dashpot control system. A platen holding a document is generally illustrated at 10. A scanning mirror system includes two movable mirrors 12 and 14. The mirror 14(half-rate mirror) is arranged to move at half the speed and distance of the mirror 12(full-rate mirror) during scanning to maintain the optical distance constant between the document on the platen 10 and the lens 16.

A tubular lamp 18 extends across the platen 10 parallel to the mirror 12 and moves with mirror 12 in a fixed relationship. The lamp 18 illuminates thee document through the platen during scanning. There is an optical path extending from the platen 10 to the mirror 12 to the mirror 14, through the lens 16 to the mirror 20 and finally to the photoreceptor surface 22. The photoreceptor surface may take the form of any suitable belt or drum.

The mirrors 12 and 14 are mounted respectively on carriages 24 and 26. The carriage 24, supporting lamp 18, runs on a guide rod or tube 28 and the carriage 26 runs on a guide tube 30. A common guide bar 32 is provided at the oppposite sides of the carriage to support and stabalize the carriages. The carriage 24 is driven via cable 31 by a capstan 34 mounted on a suitable drive shaft, preferably the shaft carrying the photoreceptor drum.

The movement of the carriage 26 is controlled by a single pulley and cable arrangement, wherein the cable 38 extends between the carriage 24 and a fixed point on the machine from over the pulley which is mounted on the carriage 26. The cable 38 is held in tension by means of a secondary cable drive 40 from a smaller diameter capstan 42 attached to the capstan 34. As shown, the cable 40 passes over a pulley 44 and is connected at its end opposite the capstan 42 to the carriage 26. A tension spring 46 is interposed in the cable 40 for tensioning.

A suitable not shown scan switch is located on the full rate carriage 26 and provides timing signals. If the scan switch is not actuated at the proper time, a jam or abnormal condition will be sensed. In operation, a scan drive clutch signal is provided to the scan drive clutch (not shown) to drive the scan drive shaft. The rotation of the scan shaft drives the scan drive pulleys and driving motion in turn is transmitted to the carriages 24, 26.

As the carriages are driven, rotation of the scan drive shaft winds a (not shown) return spring. When the full rate carriage 24 reaches the scan end position, the scan switch is actuated by a suitable not shown end of scan ramp. The scan drive clutch will then de-energize and cause the return spring, at this point fully wound, to unwind rapidly causing the scan drive shaft to rotate in a reverse direction. This rotation winds up the scan cables on the scan drive pulleys in the opposite direction causing the carriages 24, 26 to be moved to the left or scan home position. At the scan home position, the scan switch is activated by another suitable not shown ramp to provide an end of flyback signal.

The activation of the scan switch by the beginning of scan ramp and the end of scan ramp provides signals to suitable control logic to be able to determine the time period between switch activation by the ramps in both the forward scan direction and the reverse or flyback scan direction. For a more detailed discussion, reference is made to U.S. Pat. No. 4,305,653 incorporated herein.

The drive capstan 34 is operatively connected to the shaft during scanning by means of the clutch actuated by a conventional solenoid (not visible). In its start-of-scan position, the carriage 24 rests again an end stop or buffer 48 and at the end of the rescan stroke or flyback the carriage collides with the same end stop 48. In order to soften the collision and avoid damage to the system, particularly the lamp 18, which is delicate especially when hot, the velocity of the carriage 24 when it reaches the end stop 48 is controlled by a dashpot 50. In a preferred embodiment, the dashpot 50 acts on the halfspeed carriage 26 and has reduced space requirements, but it could equally act directly on the full speed carriage 24. However, by virtue of their being connected as described above, direct control of the velocity of one carriage has the effect of also controlling the velocity of the other carriage.

Figure 2:
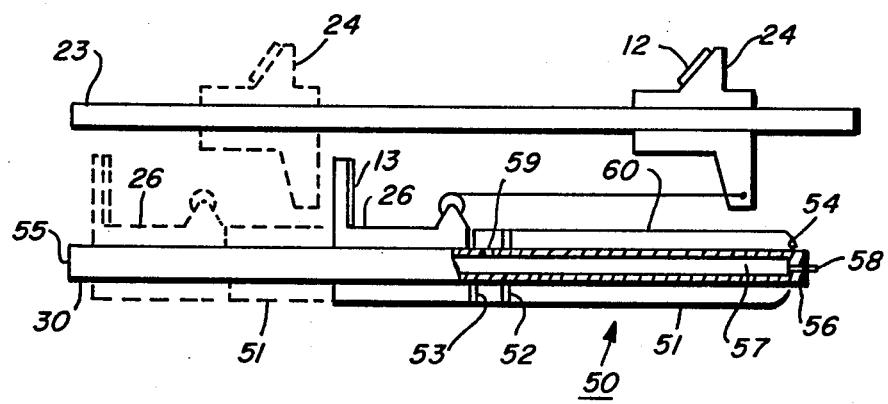
FIG. 2 is a sectional view of the dashpot shown in FIG. 1.

The dashpot 50 described in detail with reference to FIG. 2, also illustrates schematically the scanning mirror carriages 24 and 26. The latter are shown in solid lines in their start-of-scan positions and in broken lines in their "end-of-scan" positions. The dashpot 50 comprises a cylinder 51 slidably mounted on the guide tube 30 and a piston 52 fixedly mounted on the tube 30. The cylinder 51 is connected at one end 53 of the carriage 26, the end 53 being closed and sealingly engaging the tube 30. The other end 54 of the cylinder is preferably open. The piston 52 is annular in form and is secured to the tube 30 in a position close to that of the end wall 53 of the cylinder in the start-of-scan position of the carriage 26, i.e. when the carriage 24 is abutting the buffer 48 as seen in FIG. 1.

The guide tube 30 is closed at both ends by end walls 55 and 56 defining a chamber 57. One of these walls, the wall 56 as shown, has therein an aperture 58 by which the chamber 57 is vented to atmosphere. This aperture 58 is advantageously defined by an adjustable bleed jet screwed into the end wall 56. A further aperture 59 is provided in the tubular wall of the guide tube 30 intermediate the piston 52 and the closed cylinder end wall 53 and adjacent the piston. As shown, this aperture 59, which is larger than the aperture 58, is arranged beyond the end position of the piston 52 relative to the cylinder end wall 53 defined by the position of the cylinder 51 as shown in solid lines in FIG. 3. An additional aperture 60 is provided in the cylinder wall 51. This aperture 60 is preferably of sufficient size to avoid the dashpot having any damping effect until this aperture has been covered by the piston 52.

At the start of a copying cycle (the carriages being in their start-of-scan positions illustrated), the capstan 34 is clutched in and drives the carriages to scan a document on the platen 10. During scanning the carriages are driven slowly in a controlled constant speed manner, and at this slow speed, the dashpot does not materially adversely affect their motion. At the end of the scanning stroke, the clutch is disengaged and the carriages 24 and 26 are driven in the opposite direction by the spring attached to the capstan 34. Initially, the carriages accelerate under the influence of the spring, during which time the venting area of the aperture 60 is sufficient to at least substantially avoid damping of the movement of the carriages. As the aperture 60 is passed and closed by the piston 52, the damping effect of the dashpot takes over and the carriages are decelerated in a controlled manner.

By suitable choice of the sizes (and/or number) of the apertures 58 and 59, when the cylinder reaches its end position illustrated, the carriages will have decelerated sufficiently to avoid damage to the system as the carriage 24 strikes the buffer 48. The provision of the chamber 57 permits the cylinder end wall 53 and the piston 52 to be closely disposed at the end of the damping stroke without impairing the damping effect of the dashpot. The location of the aperture 59 beyond the end position of the cylinder end wall 53 at the end of the damping stoke ensures that the carriages will always reach their end positions since they will still have a finite velocity when the carriage 24 strikes the stop 48.

The time period of carriage flyback 24 is measured for each carriage return to be able to automatically adjust the dashpot 50 to maintain a standard flyback time. The scan mounted on the scan carriage 24 is activated at the end-of-scan position by the switch actuator or ramp mounted on the machine frame in the path of the carriage. The other switch actuator or ramp is located at the home position to activate the scan switch when the carriage returns to the home position. These two signals, the end of scan and home position signals, are conveyed to the controller 80 which determines the time period flyback.

The actual flyback time period is then compared to a standard window or acceptable range of flyback time to determine whether or not an adjustment needs to be made to the dashpot 50. For example, in a preferred embodiment, the desirable range of flyback times is between 300 and 340 milliseconds. It may be desirable also in some applications to set extreme limits where automatic adjustment of the dashpot is unsuitable and corrective action by a tech rep is necessary. That is, a time period of return less than 200 milliseconds might indicate excessive speed of return and a time period of return greater then 600 milliseconds might indicate an extremely slow rate of return requiring more extensive corrective action.

If automatic corrective action is called for, the procedure for corrective action in accordance with the present invention would be as follows. The adjust drive signals 81, illustrated in FIG. 3, is conveyed to a solenoid 82 to activate the solenoid and move its associated armature 84. Rigidly secured to one end of the armature 84 is a ratchet wheel 86, adapted for engagement with the air bleed screw 88 on the dashpot 50, when the solenoid 82 is activated.

Thus, there is engagement of the ratchet wheel 86 with the air bleed screw 88 when the solenoid 82 is activated an no engagement of the ratchet wheel 86 with the air bleed screw 88 when the solenoid 82 is not activated. The adjust drive signals 81 to the solenoid 82, therefore, determine the engagement or disengagement of the air bleed screw 88 and the ratchet wheel 86. Also, mounted for engagement also with the ratchet wheel 86 is a pawl 90. In a preferred embodiment, the pawl 90 is rigidly secured to the scanning carriage 24 and suitably mounted on the scanning carriage for engaging the ratchet wheel 86 during forward, scan and flyback of the carriage.

With the solenoid 82 inactivated, the ratchet wheel 86 is pulled away from engagement with the air bleed screw 88. In this situation, even though the pawl 90 will make engagement in one of the notches of the ratchet wheel 86, the ratchet wheel will freely turn without engagement with the air bleed screw 88. On the other hand, with the solenoid 82 activated, the ratchet wheel 86 will be thrust by the solenoid armature 84 into engagement with the air bleed screw 88. Upon the ratchet wheel becoming engaged with the pawl 90, the ratchet wheel 86 will turn one notch either in the clockwise or counterclockwise direction and will drive the air bleed screw 88 in either the counterclockwise or clockwise direction accordingly.

For example, if the time period of flyback is less than 300 milliseconds, the controller 80 determines that flyback return is too fast. An increase in the damping function of the dashpot is therefore necessary, in order to slow the speed of carriage flyback. The solenoid 82 will be activated to push the ratchet wheel 86 into engagement with the pawl 90 on the scanning carriage 24 during the forward motion of the scanning carriage. Thus, during the forward motion of the scanning carriage 24 on the next document scan, the controller 80 will activate the solenoid 82 and the armature 84 will thrust the ratchet wheel 86 into the position for engagement with the pawl 90 on the scanning carriage.

As the scanning carriage 24 moves from the home position to the end of scan position, the pawl 90 will engage the ratchet wheel 86 between a pair of teeth turning the ratchet wheel 86 one notch counterclockwise. In turn, the teeth on the ratchet wheel 86, being in engagement with the teeth on the air bleed screw 88, will drive the air bleed screw in the clockwise direction. The clockwise motion of the air bleed screw 88 will tighten the screw in the air bleed, thus providing a greater damping effect of the dashpot 50 on the carriage during the next flyback.

During the next flyback scan, again the flyback time period will be determined by the controller 80 from the end of scan position and home position signals conveyed to the controller. If the time period is still less than 300 milliseconds, again the solenoid 82 will be activated during the forward scan of the carriage. This will cause engagement of the pawl 90 with ratchet wheel 86 to drive the ratchet wheel counterclockwise and in turn drive the air bleed screw one notch clockwise to further tighten the screw. The procedure is repeated on each subsequent forward scan until the dashpot 50 has been sufficiently adjusted to slow down the carriage flyback for the time period of flyback to be within the 300 to 340 millisecond window. As long as the flyback time remains within the 300 to 340 millisecond window, no adjust drive signals 81 will be conveyed to the solenoid 82 and there will be no adjustments made to the dashpot 50 via the air bleed screw 88.

In a similar manner, if the flyback time period is greater than 340 milliseconds, the flyback time is too slow and it will be necessary to speed up the carriage flyback. As in the case of a flyback time period being too fast, with the flyback time period too slow, the controller 80 will convey an adjust drive signal to the solenoid 82. However, the adjust drive signal will be conveyed to the solenoid only during carriage 24 flyback rather than carriage forward scan. Therefore, the pawl 90 will again engage the ratchet wheel 86. This time, however, the engagement of the pawl 90 with the ratchet wheel 86 will be from the pawl 90 moving in the opposite direction or in the flyback direction. Thus, the pawl 90 will engage the ratchet wheel 86 and cause the ratchet wheel to be rotated clockwise rather than counterclockwise.

Since the ratchet wheel 86 teeth are in engagement with the air bleed screw 88, the movement of the ratchet wheel in the clockwise direction will cause the air bleed screw 88 to move in the counterclockwise direction. Thus, each time the solenoid 82 is activated during the carriage flyback, the air bleed screw 88 will turn one notch counterclockwise. This loosens the screw in the air bleed and lessens the damping effect on the scan carriage 24. The process of loosening the air bleed screw 88 one notch for each traverse of the scan carriage from the end of scan position to the home position will continue until the speed of the return of the scan carriage is again within the 300 to 340 millisecond range.

With reference to FIGS. 4a and 4b, there is illustrated a flow chart of the control sequence in accordance with the present invention. In particular, the begin scan block 150 indicates the start of the optical scan. The too fast block 152 and the turn off, turn on solenoid blocks 154, 156 illustrate the compensation for a flyback that is too fast. In particular, the solenoid is activated for dashpot adjustment, that is, to slow the next flyback time.

The scan timer done block 158 represents the timer that will time out at the end of scan to identify the end of scan, the early timer block 160 and the later timer block 161 begin the window timers, and the turn off clutch block 162 determines the start of flyback.

The too slow block 164 and the turn off, turn on solenoid blocks 166, 168 illustrate the compensation for a flyback that is too slow. In particular, the solenoid is activated to speed up the next flyback time. The remaining steps of the sequence are merely steps to set appropriate flags if the carriage returns either too early or too late. The information to be used during the next flyback.

Figure 5:
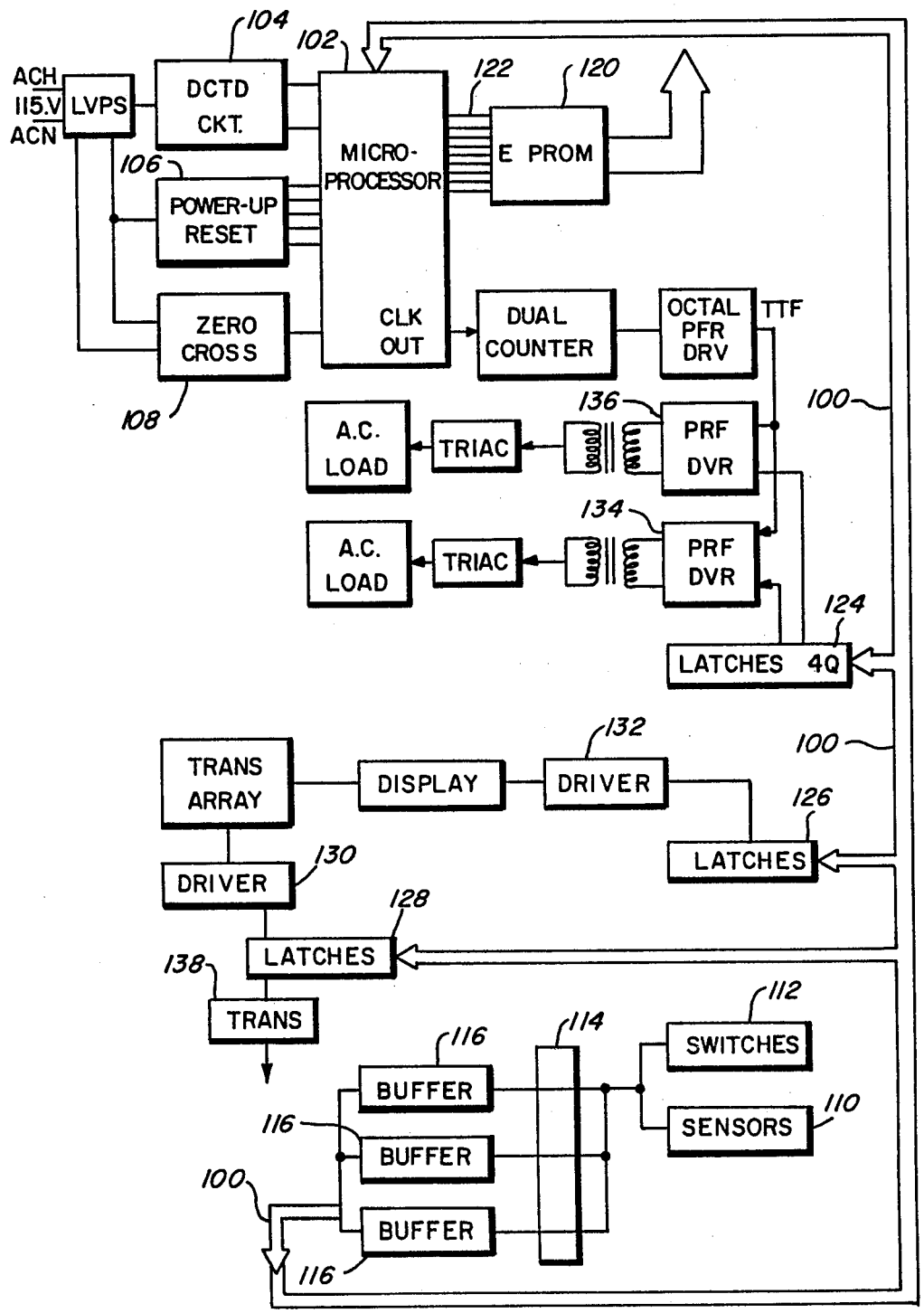
FIG. 5 is a block diagram of the details of the controller shown in FIG. 3.

In reference to FIG. 5, there is shown the controller or control logic 80 including a bidirectional bus 100, microprocessor 102, dedicated circuitry 104, power up reset circuitry 106, and zero cross-over circuitry 108 for controlling a reproduction machine. Preferably, the microprocessor 102 includes a 2K by 8 read only memory ROM, an address stack, a 64 by 7 random access memory RAM, an 8 bit arithmetic logic unit ALU, a control, a clock counter, a programmable timer, an interrupt control, an 8 bit input-output port, and an analog to digital converter ADC interconnected to a common internal bus. The bidirectional bus 11 interconnects the microprocessor 102 and the reproduction machine and generally conveys signals from sensors 110 and switches 112 of the machine to microprocessor 102 and conveys control signals from microprocessor 102 to the machine via suitable drivers. For a more detailed discussion of microprocessor 102, reference is made to U.S. Ser. No. 80,624 filed Oct. 1, 1979, incorporated herein.

The signals of various reproduction machine switches 112 and sensors 110 are conveyed through a resistance network 114 and suitable buffers 116 to the 8 bit external data bus 100 connected to microprocessor 102. Typically, the resistance network 114 is any standard dual inline package configuration of thick film elements baked onto a ceramic substrate, terminated with wire leads and providing resistance in the range of 22 ohms to 220 Kohms. Buffers 116 are preferably octal buffers and line drivers with three state outputs. The 8 bit data bus 100 is also connected to a suitable memory device such as EPROM 120 interconnected to microprocessor 102 through suitable address lines 122. It should be noted that the EPROM device 120 can be replaced by a suitable read only memory internal to the microprocessor 102.

Outputs to the reproduction machine controlled elements are conveyed from the microprocessor 102 along the external data bus 100 to various latches 124, 126 and 128. The latches are preferably Schotky TT1 octal d-type flip-flops and are interconnected to various drivers 130, 132, 134 and 136 or transistors 138 to activate various clutches, solenoids, motor drivers, triacs and power supplies in the machine. Typical drivers 130 and 132 are high voltage, high current Darlington transistor arrays with high breakdown voltage and internal suppression diodes. Preferably, drivers 134 and 136 are peripheral NAND gates.

Figure 6:
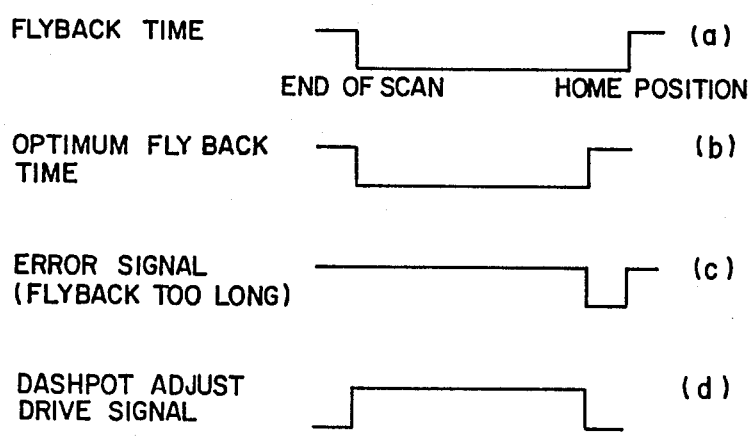
FIG. 6 is a timing diagram in accordance with the present invention.

FIG. 6 is an example of the timing signals in acccordance with the present invention. FIG. 6a illustrates an actual flyback time period signal that is monitored by the controller 80 to sense actual flyback time. One end of the signal illustrates the end-of-scan activation of the scan switch and the other end of the signal illustrates the activation of the switch at home position. FIG. 6b illustrates the optimum flyback time or the flyback time window that is stored in the logic for comparison to the actual flyback time. FIG. 6c illustrates the error signal when the actual flyback time of FIG. 6a is compared to the stored optimum flyback time of FIG. 6b. In this particular illustration, the error signal represents a flyback time that is too long.

This error signal is stored in the controller memory for use during the next copy cycle, and in particular, since the flyback time is too long, for use to activate the air bleed screw during the carriage flyback. FIG. 6d illustrates the dashpot adjust drive signal. This represents the signal that is applied during the carriage flyback to the adjustment solenoid 82 to activate the solenoid during the flyback time period. It should be noted that it is necessary to activate the adjustment solenoid with a suitable signal for a period long enough during either forward scan or flyback to make sure that the pawl 90 secured to the carriage engages the ratchet wheel 86 while the ratchet is in engagement with the air bleed screw.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. A reproduction machine with a scanning carriage mounted for movement on a support member comprising:
    a pneumatic dashpot for the carriage having a tubular member defining a pneumatic chamber vented to atmosphere by a venting aperture,
    an air bleed screw communicating with the venting aperture for adjusting said venting aperture,
    a scan switch mounted on the carriage to provide an end-of-scan position signal and a home position signal,
    a controller responsive to the end-of-scan position and home position signals to determine the time period of scan flyback, the controller providing an adjust drive signal in response to the scan flyback time,
    an adjustment solenoid with armature, a ratchet wheel secured to one end of the armature, the armature moving the ratchet wheel into engagement with the air bleed screw upon receiving an adjust drive signal from the controller, and
    a pawl secured to the carriage for engaging the ratchet wheel upon movement of the carriage whereby in response to the adjust drive signals from the controller, the ratchet wheel in engagement with the air bleed screw is driven by the pawl to adjust the air bleed screw in response to the determined flyback time.

2. The apparatus of claim 1 wherein upon determining that the flyback time period is relatively high, the pawl engages the ratchet wheel during a first scan direction of the carriage to drive the air bleed screw in a direction to tighten the screw, providing a greater damping of the dashpot during the carriage flyback.

3. The apparatus of claim 1 wherein upon a determination that the flyback time period is relatively low, the pawl engages the ratchet wheel during a second scan direction of the carriage to drive the air bleed screw in a direction to lessen the damping of the dashpot.

4. A reproduction machine having a plurality of components and a photoreceptor cooperable with one another to produce impressions on support material comprising a scanning carriage for scanning a document to be reproduced, the carriage scanning the document in a forward scan direction from a home position and returning to the home position in a flyback direction after reaching the end of scan, a device for automatically adjusting the flyback time period of the carriage, a scan switch providing signals at the home position and end-of-scan position to determine the time period of flyback, and a controller responsive to the scan switch signals to determine the flyback time period, the controller providing adjust drive signals to the device for automatically adjusting flyback time whereby the carrige flyback time period is automatically adjusted.

5. The apparatus of claim 4 wherein the device for adjusting flyback time includes a dashpot and an air bleed screw including the means to automatically adjust the air bleed screw.

6. The apparatus of claim 5 including the means to automatically adjust the air bleed screw in a first direction to provide increased damping of the dashpot.

7. The apparatus of claim 5 including the means to automatically adjust the air bleed screw in a second direction to provide decreased damping of the dashpot.

8. The apparatus of claim 7 including a ratchet wheel secured to an armature of a solenoid, the ratchet wheel engaging the air bleed screw upon activation of the armature, and a pawl secured to the carriage for engaging the ratchet wheel to drive the air bleed screw.

* * * * *